United States Patent [19] [11] 3,956,029
Yamamoto et al. [45] May 11, 1976

[54] ANNEALING SEPARATOR FOR HEAT TREATMENT OF SILICON STEEL SHEETS

[75] Inventors: Takaaki Yamamoto; Osamu Tanaka; Hirotada Katoh; Shozaburo Nakashima, all of Kitakyushu, Japan

[73] Assignee: Nippon Steel Corporation, Tokyo, Japan

[22] Filed: May 31, 1974

[21] Appl. No.: 475,266

[30] Foreign Application Priority Data
June 7, 1973   Japan.............................. 48-64085

[52] U.S. Cl. ................................ 148/27; 148/31.5; 148/31.55; 148/113
[51] Int. Cl.² ........................................ B23K 35/24
[58] Field of Search................ 148/27, 31.5, 31.55, 148/113; 117/127, 222

[56] References Cited
UNITED STATES PATENTS

| | | | |
|---|---|---|---|
| 2,354,123 | 7/1944 | Horstman et al. | 148/113 |
| 2,906,645 | 9/1959 | Carpenter et al. | 117/127 |
| 3,186,867 | 6/1965 | Forslund et al. | 117/127 |
| 3,653,984 | 4/1972 | Urushiyama et al. | 148/113 |
| 3,700,506 | 10/1972 | Tanaka et al. | 148/111 |

OTHER PUBLICATIONS

Merk Index; New Jersey, 1940, p. 330.

Primary Examiner—Walter R. Satterfield
Attorney, Agent, or Firm—Toren, McGeady and Stanger

[57] ABSTRACT

Annealing separator for heat treatment of a silicon steel sheet comprising not more than 0.2% $SO_3$, not more than 0.04% Cl with the balance being MgO and unavoidable impurities, and having a bulk density between 0.18 and 0.30 g/cm³, and a particle size distribution of 40 to 70% of particles not larger than 3μm, 10 to 25% of particles not smaller than 10μm, not more than 15% of coarse particles larger than 15μm with the balance being intermediate particles between 3μm and 10μm.

2 Claims, No Drawings

ANNEALING SEPARATOR FOR HEAT TREATMENT OF SILICON STEEL SHEETS

The present invention relates to an annealing separator composition used in high-temperature box annealing in the production of silicon steel sheets or strips (hereinafter referred to as sheet).

Magnesia annealing separator used in the annealing of a silicon steel sheet, particularly a grain-oriented silicon steel sheet, is required not only to have the ability of preventing the bonding together of the sheets during the heat treatment, but also the ability of forming a good glassy insulating film on the steel surface.

As for a method for producing glassy film on the surface of a silicon steel sheet by using a magnesia annealing separator, the method disclosed in a Japanese Pat. Publication No. 27-2409, for example, has been widely used.

According to this method, silicon which is present near the surface of the steel sheet is selectively oxidized to form silica, and then a slurry in which magnesia annealing separator has been dispersed is applied onto the steel surface. The steel sheet with the slurry applied is subjected to a heat treatment to combine the magnesia in the annealing separator with the silica in the surface of the steel sheet so as to form the glassy film.

The glassy film thus formed is required to have sufficient heat resistance to resist deterioration by strain relieving annealing which is preformed for using the steel sheet as a material for the iron cores of transformers. Also, it is required to have an adhesion property strong enough to resist against peeling-off during the subsequent workings as well as to have a high laminar resistance and an excellent space factor.

However, conventional magnesia annealing separators have the following defects which are important factors in lowering the production yield of silicon steel sheet products. Namely, magnesia is easily dispersed in water so that hydration takes place and a part of the magnesia is converted into magnesium hydroxide. While free water, which is not in a combined state, can be removed easily at low temperatures, a temperature as high as about 350°C is necessary for decomposition of the magnesium hydroxide. Therefore, the hydrated water is brought into the box annealing furnace, and a large amount of water is liberated therein by the decomposition so that the steel surface is oxidized.

This oxidation often embrittles the steel sheet considerably, and the embrittlement is especially severe when the steel sheet is annealed in the form of a coil.

Also, in case of annealing the coiled steel sheet, the liberation of water from the annealing separator is not uniform so that excessive localized oxidation takes place, thus hindering the formation of the glassy film and causing an irregular thickness of the glassy film. Such an irregular film thickness deleteriously effects the flatness of the steel sheet.

Also when the steel sheet is coated with a conventional annealing separator and then coiled, the lubricity of the steel surface is not uniform or is insufficient due to the annealing separator applied thereon so that the steel sheet is susceptible to deformation strain during the heat treatment due to uneven stress and irregular temperature distribution within the coil. Thus, the flatness of the steel sheet is remarkably deteriorated, thus causing considerable lowering of the product yield.

The present invention has been made for the purpose of providing a magnesia annealing separator which is free from the above defects.

The main component of the annealing separator of the present invention is magnesia, which may be contained in a similar amount as in the conventional magnesia annealing separators, and although it is not specifically limited in its amount in the present invention it is contained normally in an amount not less than 94%.

In the annealing separator of the present invention, $SO_3$ should be limited to 0.2% or less and Cl should be limited to 0.04% or less in order to attain the object of the present invention satisfactorily. These components, $SO_3$ and Cl, are vapourized into corrosive gases during the annealing under a high-temperature atmosphere and attack the steel surface so that the film quality is deteriorated resulting in an irregular film thickness and surface roughness, as well as, peeling-off of the film during the subsequent workings.

Also the annealing separator of the present invention should have a bulk density between 0.18 and 0.30 $g/cm^3$, and when the bulk density is less than 0.18 $g/cm^3$ the separator is activated and easily hydrated. On the other hand when the bulk density is more than 0.30 $g/cm^3$, its effect is not increased relative to the increase in production cost.

Regarding the hydrated water, it should be maintained at not more than 4%, and when the hydration degree is high, the amount of water brought into the box annealing furnace is increased so that the annealing atmosphere becomes excessively oxidizing and hinders formation of the glassy film, thus causing embrittlement of the steel sheet and deterioration of the flatness of the steel sheet.

In the annealing separator of the present invention, the particle size distribution has an important effect in attaining the object of the present invention.

The particle size distribution of the annealing separator of the present invention should be adjusted so as to assure 40 to 70% of super fine particles not larger than $3\mu m$, and 10 to 25% of coarse particles not smaller than $10\mu m$, with not more than 15% of particles not smaller than $15\mu m$, the balance being intermediate particles between 3 and $10\mu m$.

In general, it is known that a smaller particle diameter of magnesia particles increases the hydration speed.

However, in the present invention, as the bulk density of magnesia is limited to not less than 0.18 $g/cm^3$ which represents heavy magnesia, the effect of the particle size is small and a low degree of activation can be obtained. But, due to a large proportion of the fine particles, very good dispersion in water is obtained in the present invention.

The present inventors have discovered that the properties of magnesia, particularly adjustment of its particle size distribution, is a very important factor for preventing the deformation strain of the steel sheet as mentioned hereinbefore, and the particle size distribution has been specifically defined as above.

According to the studies conducted by the present inventors, when an annealing separator of fine magnesia having an average particle size of about $5\mu m$ and having a small range of the particle size distribution is used for treatment of a silicon steel sheet, local deformed portion having a convex and concave form, namely, convex and concave deformation, occurs very often on the inside of the coil despite uniform and satisfactory formation of the glassy film. However a wrinkle-like deformation portion does not occur on the outside of the coil.

As used herein, $\mu$m represents "micrometer" or 1/1,000,000 meter.

When relatively coarse particles having an average particle diameter of about 10$\mu$m are added to the above fine magnesia in a gradually increasing amount, the above convex and concave deformation is reduced as the addition amount increases and eventually the deformation disappears.

If the above relatively coarse particles are further added, the wrinkle-like deformation begins to appear. Of course, the occurrence of this deformation varies depending on the treating conditions and the nature of the steel sheet before the treatment.

Although the relation between the particle size distribution of the annealing separator and the occurrence of deformation strain has not yet been clarified, it can be assumed to be as follows.

When the steel sheet is coiled, the coiling tension is larger at the inner side of the coil, and the coiling tension is smaller at the outer side of the coil.

Therefore, it is considered that the friction between the steel sheets in the inside of the coil is larger and it becomes smaller at the outer side of the coil. And as the coiling tension is larger on the inside of the coil, the inside is more tightly coiled. Thus the inside of the coiled steel sheet is easily subjected to uneven stress.

When a coil under such conditions is subjected to heat treatment, the steel sheet becomes softer as the temperature increases and is deformed by the uneven strain. This is the cause of the convex and concave deformation. It is considered, therefore, that if the friction between the steel sheets is reduced so as to allow the steel sheets to easily move, the uneven stress can be reduced, and thus the convex and concave deformation is reduced.

In this way, it can be understood that the mutual sliding between the steel sheets becomes easier as the addition of the proportion of coarse magnesia particles is increased and thus the convex and concave deformation is reduced.

However, an excessively large particle size or an excessively large proportion of the coarse particles should be avoided because it brings the coil into a telescope form. Also, the outside of the coil has small friction and this friction is further reduced when coarse magnesia particles are added, so that the mutual moving of the steel sheets become more free. As a result, when thermal stress is produced by the temperature difference within the coil, the deformation of the steel sheet is more easily caused thereby.

If the friction between the steel sheets is large, the sheet is maintained flat as originally and is hard to deform. It can be understood from this fact that the excessive addition of the coarse particles causes more frequent occurrence of the wrinkle-like deformation.

The particle size distribution of magnesia composing the annealing separator should be adjusted in view of the above, so as to maintain the friction between the steel sheets in an appropriate range for preventing deformation of the steel sheet during the coil annealing.

The present inventors have made various studies on the particle size distribution of magnesia, and have defined the particle size distribution as above.

The particle diameter of magnesia composing the annealing separator is specified so as to assure that the amount of fine particles of not more 3$\mu$m, falls in the range of from 40 to 70%, and if this fine particle proportion is less than 40%, the dispersion of the annealing separator in water is not satisfactory, and at the time of the glassy film formation, the reaction with the silica layer formed on the steel surface is not satisfactory.

On the other hand, if the fine particle proportion is more than 70%, the proportion of the coarse particles is smaller and it is impossible to prevent the deformation strain during the annealing. It is desirable that the proportion of the coarse particles of more than 10$\mu$m is between 10 and 25%, and if the proportion is less than 10%, no effect of the addition is obtained, while if the proportion is more than 25%, the sheet becomes slippy and is coiled in a telescope form during the coiling after the application of the annealing separator.

In the coarse particle portion, coarser particles of more than 15$\mu$m contribute to cause the wrinkle-like deformation. Therefore, such coarser particles should be maintained at less than 15%.

The annealing separator of the present invention has the composition and structure as above, and may be prepared by burning magnesium compounds, usually magnesium hydroxide or magnesium carbonate at a high temperature above 800°C. Magnesia produced by burning the above magnesium compounds at such a high temperature is of heavy weight, chemically stabilized with low activity, and yet, has a small particle porosity due to the grain growth mechanism.

The annealing separator of the present invention may contain commercially available magnesia for particle size adjustment within the scope of the present invention, and also may contain metal oxides, such as, $TiO_2$ and $MnO_2$, if necessary.

The present invention will be more clearly understood from the following examples in comparison with controls.

Control 1

Cold rolled grain-oriented silicon steel sheet containing 3.25% Si and substantially no Al (0.35 mm thick, 890 mm wide and about 2000 m long) was subjected to a shorttime continuous annealing for 4 minutes at 830°C in a wet decomposed ammonia atmosphere having a dew point of 61°C. Meanwhile, high-purity magnesium hydroxide was burnt in a rotary kiln, crushed and sieved out to obtain a magnesia annealing separator of 0.09% $SO_3$ and 0.02% Cl with the balance being MgO, having a bulk density of 0.23 g/cm$^3$ and a particle size distribution of: 50.7% of particles not larger than 3$\mu$m; 33.3% of particles from 3 to 6$\mu$m, 11.0% of particles from 6 to 10$\mu$m, 3.8% of particles from 10 to 15$\mu$m and 1.2% of particles larger than 15$\mu$m with a smaller proportion of coarse particles. The thus obtained separator was mixed with pure water with a mixing ratio of 10 kg/100l at a liquid temperature of 8°C by stirring the mixture in a mixing tank for 45 minutes. Then, the thus obtained slurry was applied on the surface of the above steel sheet by a roll coater, and dried in a dryer.

For maintaining the liquid temperature at 8°C, the pure water and the mixing tank were cooled by a refrigerator. The ignition loss immediately after the drying of the applied separator was 3.26% (average) and the average coated amount was 5 g/m$^2$ on one side.

Then the steel was coiled and subjected to a finishing box annealing at 1200°C for 20 hours in a dry hydrogen atmosphere. The glassy insulating film thus formed was very uniform and of high quality. However, among the treated 19 coils, 17 coils had convex and concave deformations along a 50 to 700 m length on the inside of the coils. Meanwhile no wrinkle-like deformation was observed.

Control 2

Magnesia annealing separator having a bulk density of 0.23 g/cm$^3$, and a particle size distribution of: 53.0% of particles not larger than 3$\mu$m, 12.5% of particles from 3 to 6$\mu$m, 7.5% of particles from 6 to 10$\mu$m, 12.5% of particles from 10 to 16$\mu$m, and 14.5% of particles larger than 15$\mu$m with a large proportion of coarse particles was prepared by burning high-purity magnesium hydroxide in a muffle furnace. This annealing separator was applied on a steel sheet similarly treated as in Control 1 and dried in a similar way as in Control 1.

The average ignition loss immediately after the drying was 1.50% and the coated amount was about 6.5 g/m$^2$. Then the steel sheet was coiled and subjected to a finishing box annealing at 1200°C for 20 hours in a dry hydrogen atmosphere.

The glassy insulating film thus formed was very uniform and of good quality. However, among 17 coils, 11 coils had wrinkle-like deformations along a 55 – 800 m length on the outside of the coils. Meanwhile no convex, concave deformation was observed.

EXAMPLE 1

High purity magnesium hydroxide as used in Control 1 was burnt in a rotary kiln, crushed and sieved out into two kinds of magnesia having different particle size distributions and these two kinds of magnesia were mixed to obtain a magnesia annealing separator (0.09% SO$_3$ and 0.02% Cl with the balance being MgO). The thus obtained annealing separator was applied on the surface of a steel sheet similarly treated as in Control 1 and dried in a similar way as in Control 1. The annealing separator had a bulk density of 0.25 g/cm$^3$ and a particle size distribution of: 49.7% of particles not larger than 3$\mu$m, 24.4% of particles from 3 to 6$\mu$m, 8.1% of particles from 6 to 10$\mu$m, 10.8% of particles from 10 to 15$\mu$m, and 7.1% of particles larger than 15$\mu$m. The average ignition loss immediately after the drying was 1.48% and the average coated amount was 6 g/m$^2$ on one side.

Then the sheet was coiled and subjected to a finishing box annealing at 1200°C for 20 hours in a dry hydrogen atmosphere.

The glassy insulating film thus formed was very uniform and of good quality. All of the treated 19 coils had no convex and concave deformation and substantially no wrinkle-like deformation.

EXAMPLE 2

High-purity magnesium hydroxide as in Control 1 was burnt in a rotary kiln, and crushed and sieved out to obtain magnesia. 100 parts by weight of the thus obtained magnesia was admixed with 20 parts by weight of low-activity commercially available magnesia prepared at high-temperature burning to prepare a magnesia annealing separator (0.09% SO$_3$, 0.02% Cl with the balance being MgO) having a bulk density of 0.30 g/cm$^3$, and a particle size distribution of: 63.3% of particles not larger than 3$\mu$m, 22.1% of particles from 3 to 6$\mu$m, 3.4% of particles from 6 to 10$\mu$m, 0.8% of particles from 10 to 15$\mu$m, and 10.4% of particles larger than 15$\mu$m. This annealing separator was mixed with pure water in a mixing ratio of 11 kg/100l and stirred in a mixing tank for 35 minutes at a liquid temperature of 5°C, then the slurry thus obtained was supplied to an immersion receptacle. Then a steel sheet, treated in a similar way as in Control 1, was immersed in the receptacle and coating was done by squeeze rolls. Then the best sheet was dried in a dryer.

In order to maintain the liquid temperature at 5°C, the pure water and the mixing tank were cooled by a refrigerator. The liquid temperature at the time of coating was 15°C and the average ignition loss immediately after the drying was 1.59%, and the average coated amount was 6.8 g/m$^2$ on one side. Then the sheet was subjected to a finishing box annealing in a similar way as in Control 1.

The glassy insulating film thus formed was very uniform and of good quality. All of the treated 15 coils were free from the convex and concave deformation and the wrinkle-like deformation.

EXAMPLE 3

A cold rolled grain-oriented silicon steel containing 2.90% Si and Al (sol.Al 0.026%) of 0.35 mm thickness, 890 mm width and about 2000 m length was subjected to a short-time continuous annealing at 850°C for 4 minutes in a wet decomposed ammonia atmosphere having a dew point of 65°C. Meanwhile, 100 parts by weight of magnesia annealing separator prepared in a similar way as in Example 2, having a bulk density of 0.29 g/cm$^3$, was admixed with 7.5 parts by weight of fine TiO$_2$ powder of the anatase type in a cylindrical vessel by rotation, and this admixture was stirred with pure water with a mixing ratio of 12 kg/100l in a mixing tank for 45 minutes, maintaining a liquid temperature of 5°C. The slurry thus obtained was supplied to an immersion receptacle, in which the above treated steel sheet was immersed and coating was done by squeeze rolls, and the sheet thus coated was dried in a dryer. In order to maintain the liquid temperature at 5°C, the pure water and the mixing tank were cooled by a refrigerator. The average ignition loss immediately after the drying was 1.79% and the coated amount was 6.5 g/m$^2$ on one side.

Then the sheet was coiled and subjected to a finishing box annealing at 1200°C for 20 hours in a dry hydrogen atmosphere.

The glassy insulating film thus formed was very uniform and of good quality. All of the treated 15 coils were completely free from the convex and concave deformation and substantially free from the wrinkle-like deformation.

What is claimed is:

1. An annealing separator composition for heat treatment of a silicon steel sheet consisting essentially of not more than 0.2% SO$_3$, not more than 0.04% Cl, not less than 94% of MgO having a water of hydration of less than 4%, and unavoidable impurities, and having a bulk density between 0.18 and 0.30 g/cm$^3$, and a particle size distribution of 40 to 70% of particles not larger than 3 $\mu$m, 10 to 25% of particles not smaller than 10 $\mu$m, not more than 15% of coarse particles larger than 15 $\mu$m with the balance being intermediate particles between 3 $\mu$m and 10 $\mu$m.

2. An annealing separator composition for heat treatment of a silicon steel sheet consisting essentially of not more than 0.2% SO$_3$, not more than 0.04% Cl, a compound selected from the group consisting of TiO$_2$, and MnO$_2$, not less than 94% of MgO having a water of hydration of less than 4%, and unavoidable impurities, and having a bulk density between 0.18 and 0.30 g/cm$^3$, and a particle size distribution of 40 to 70% of particles not larger than 3 μm, 10 to 25% of particles not smaller than 10 μm, not more than 15% of coarse particles larger than 15 μm with the balance being intermediate particles between 3 μm and 10 μm.

* * * * *